Sept. 8, 1970 T. C. LAMBERTSON 3,527,359

TRAY RACK CABINET WITH REMOVABLE GUIDES

Filed April 22, 1968 9 Sheets-Sheet 1

INVENTOR.
THEODORE C. LAMBERTSON
BY
Owen, Wickersham & Erickson
ATTORNEYS

TRAY RACK CABINET WITH REMOVABLE GUIDES

Filed April 22, 1968 9 Sheets-Sheet 2

INVENTOR.
THEODORE C. LAMBERTSON
BY
Owen, Wickersham & Erickson
ATTORNEYS

INVENTOR.
THEODORE C. LAMBERTSON
BY
Owen, Wickersham & Erickson
ATTORNEYS

TRAY RACK CABINET WITH REMOVABLE GUIDES

Filed April 22, 1968 9 Sheets-Sheet 4

INVENTOR.
THEODORE C. LAMBERTSON
BY
Owen, Wickersham & Erickson
ATTORNEYS

INVENTOR.
THEODORE C. LAMBERTSON
BY
Owen, Wickersham & Erickson
ATTORNEYS

TRAY RACK CABINET WITH REMOVABLE GUIDES

Filed April 22, 1968

INVENTOR.
THEODORE C. LAMBERTSON
BY
Owen, Wickersham & Erickson
ATTORNEYS

INVENTOR.
THEODORE C. LAMBERTSON
BY
Owen, Wickersham & Erickson
ATTORNEYS

INVENTOR.
THEODORE C. LAMBERTSON
BY
Owen, Wickersham & Erickson
ATTORNEYS

INVENTOR.
THEODORE C. LAMBERTSON
BY
Owen, Wickersham & Erickson
ATTORNEYS

United States Patent Office 3,527,359
Patented Sept. 8, 1970

3,527,359
TRAY RACK CABINET WITH REMOVABLE GUIDES

Theodore C. Ambertson, Millbrae, Calif., assignor to Amrak Incorporated, Burlingame, Calif., a corporation of California Continuation-in-part of application Ser. No. 674,372, Sept. 11, 1967, which is a continuation-in-part of application Ser. No. 639,702, May 19, 1967. This application Apr. 22, 1968, Ser. No. 733,744
Int. Cl. A47f 5/00
U.S. Cl. 211—148 17 Claims

ABSTRACT OF THE DISCLOSURE

A mobile service or storage rack for supporting a plurality of trays or the like is comprised of pairs of main frame components and a plurality of similar interconnecting tray-supporting components, all of which connect together in a unique manner with a relatively few fasteners. The main frame components have upright members provided with spaced apart slots for receiving the ends of easily removable tray-supporting components in various arrangemnts. Pairs of locking frame members hold the main frame components together at their upper and lower ends. The invention covers a plurality of embodiments for accommodating different sizes and numbers of articles for carrying them from place to place or for storing them.

This application is a continuation-in-part of application Ser. No. 674,372, filed Sept. 11, 1967; now abandoned, which was a continuation-in-part of application Ser. No. 639,702, filed May 19, 1967, now abandoned.

This invention relates to an improved service or storage rack for supporting a multiplicity of articles such as trays and the like.

In the preparation and distribution of food, as in restaurants and institutions, it is necessary to handle a large number of food trays either for temporary storage or for delivery from one location to another. Heretofore, devices built for providing this function were relatively complicated as well as cumbersome and heavy. Moreover, they were difficult to assemble and to disassemble when the necessity arose to move them. The latter problem was aggravated by the fact that components of prior art devices were held together by a large number of conventional fasteners such as nuts and bolts. These often became loose over a period of use and allowed the rack to become unstable and unsafe.

A general object of the present invention is to provide an improved rack for supporting a large number of articles, such as trays, which overcomes the aforesaid problems.

Another object of the present invention is to provide a rack or article-supporting apparatus comprised of a relatively few components that can be quickly assembled or disassembled by one unskilled person by means of their unique interlocking connections. And further, it is an object of my invention to provide a rack or storage device for trays and the like that can easily be arranged in various configurations to accommodate articles at different spacing and in different positions. My rack requires only a relatively few fasteners to maintain its structural integrity. Yet, when assembled as either a stationary or movable storage device my rack is a stable, rigid structure that may be relatively lightweight but strong and will not lean or fall even when loaded unevenly.

Still another object of my invention is to provide a rack that is easy to clean and maintain in a highly sanitary condition that is essential to the cleanliness of food carried by the rack.

Another object of the present invention is to provide a storage rack having tray-supporting members that are quickly and easily removable so that the capacity and loading configuration of the rack can be altered to accommodate various loading conditions.

Another object of my invention is to provide a rack unusually adapted for ease and economy of manufacture. Essentially, only three major frame components in duplicate pairs are required, plus the desired number of identical tray-supporting side members. Complicated machinery of parts is not required, and they can all be made using conventional and inexpensive metal working techniques.

Yet another object of the present invention is to provide a storage rack that can be easily joined together with similar racks to form an extended bank of storage racks.

The specific nature of the invention as well as other objects, advantages and features thereof will become apparent from the following detailed description presented in conjunction with the accompanying drawing, in which.

Figures 5, 6:
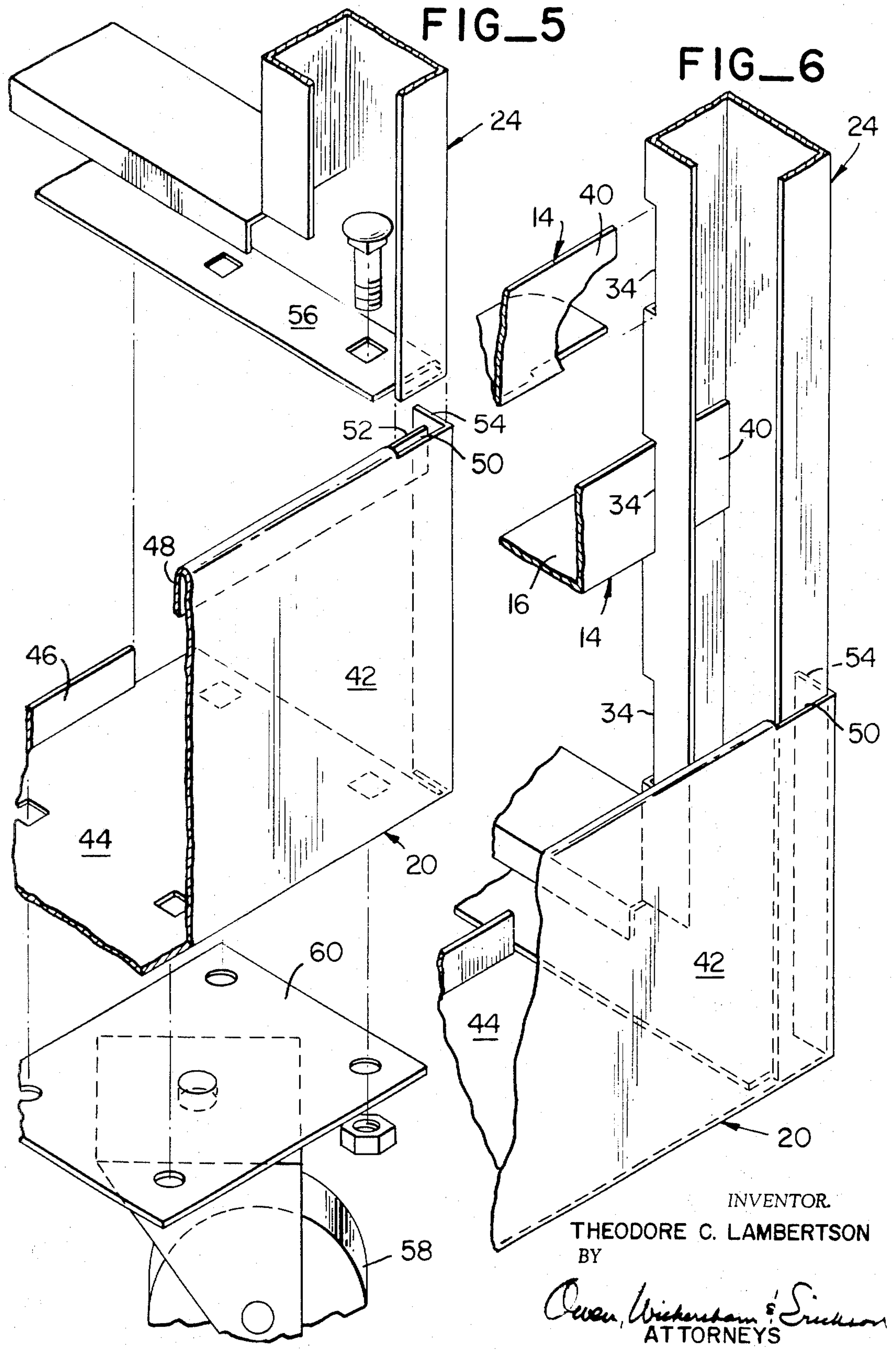
FIG. 5 is an enlarged exploded view in perspective showing disconnected members of a lower corner portion of the rack of FIG. 1.
FIG. 6 is a view in perspective similar to FIG. 5 showing the members lower corner portion fully connected.
Figure 6A:
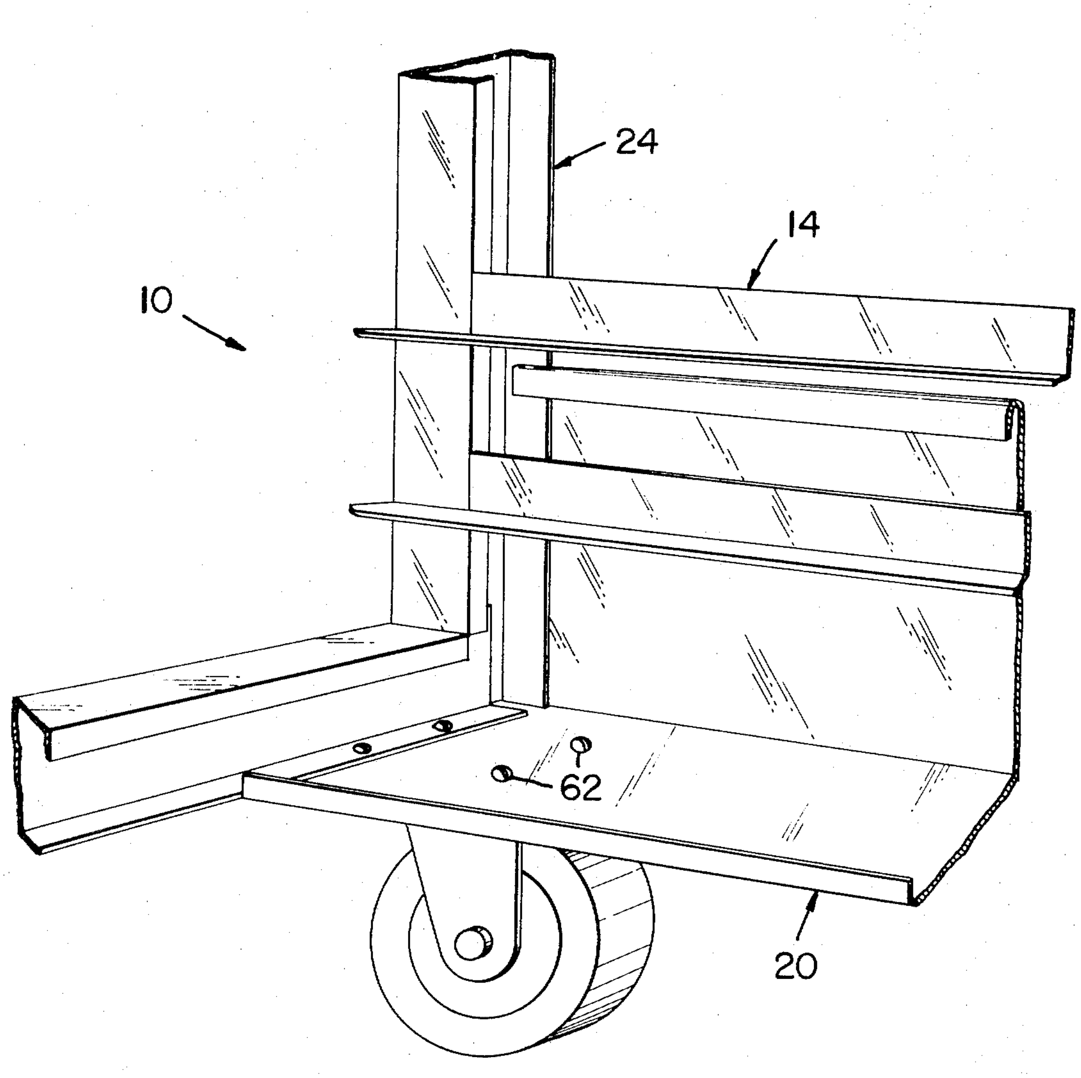
Figures 7, 8:
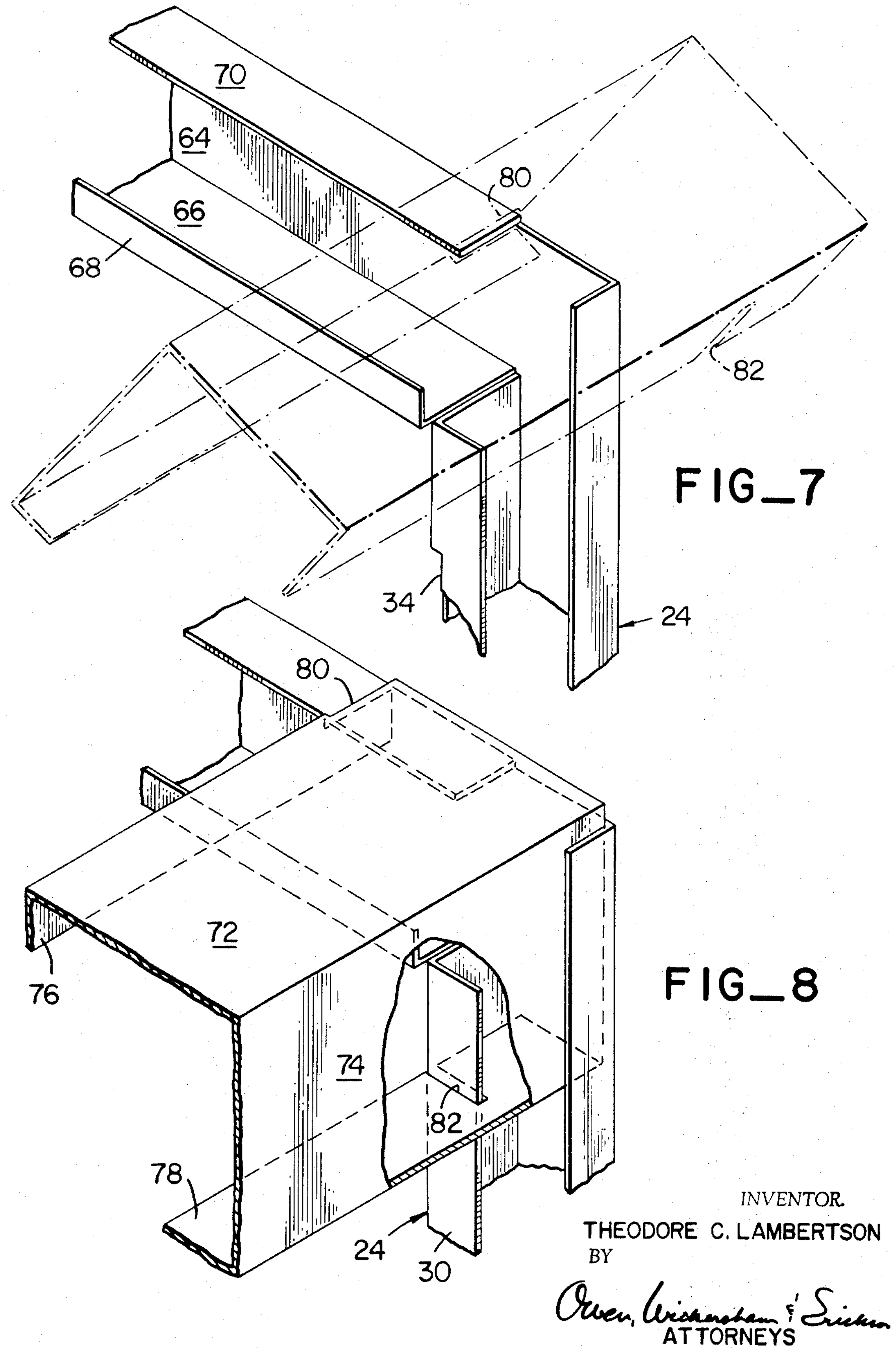
Figure 9:
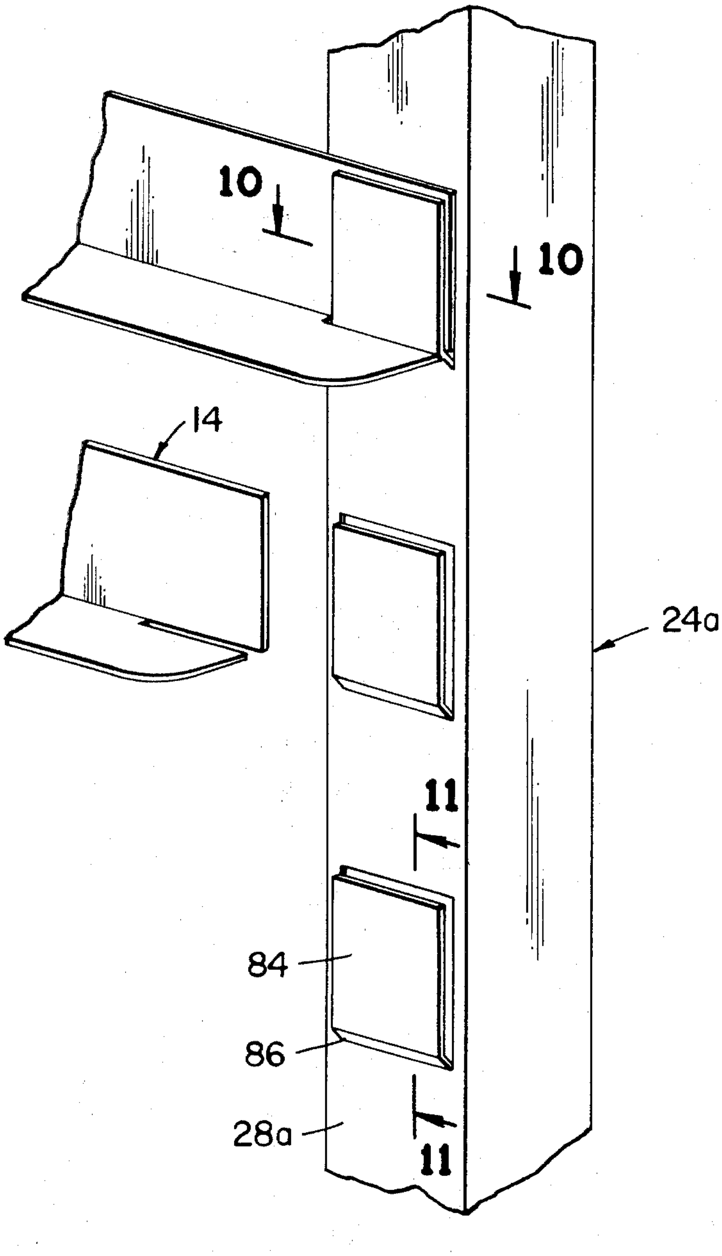
Figure 10:
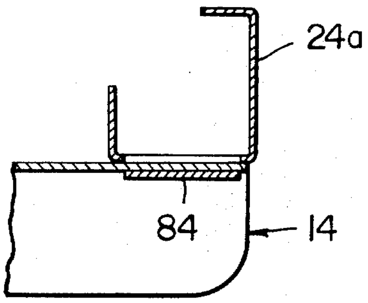
Figure 11:
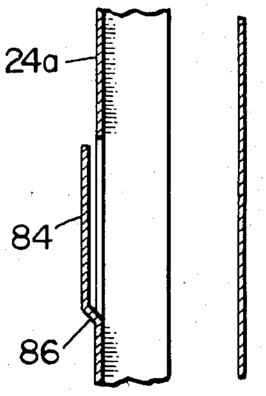
Figure 12:
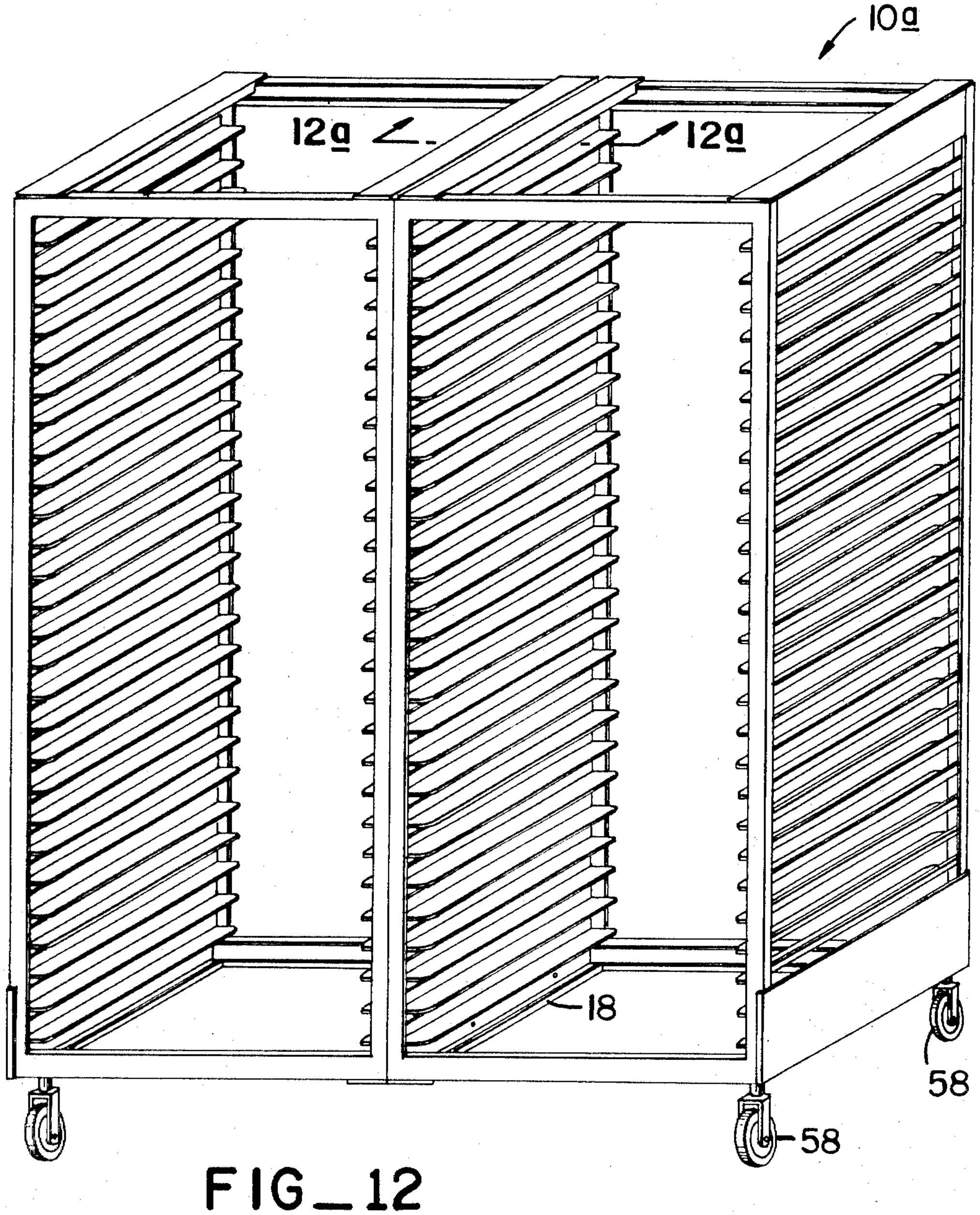
Figure 12A:
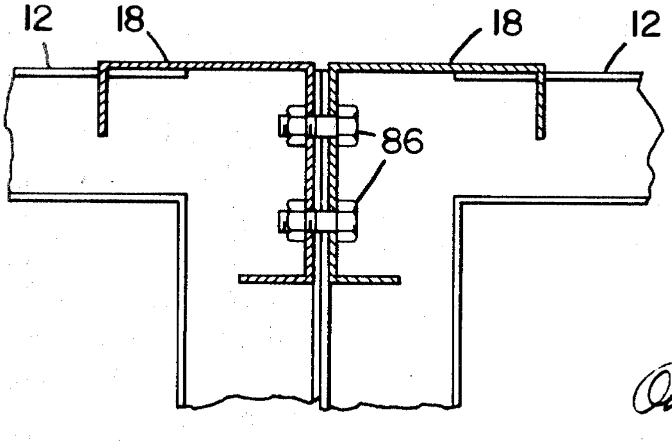
Figure 13:
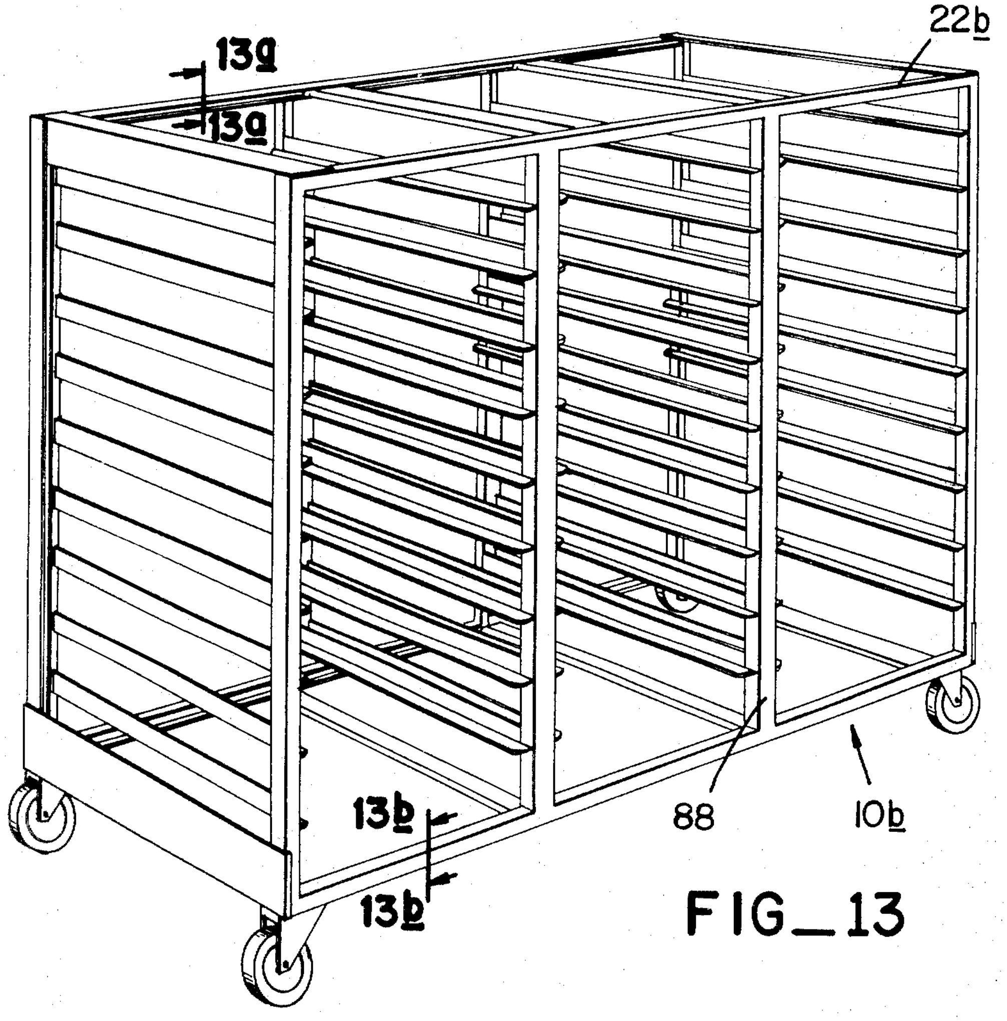
Figures 13A, 13B, 13C:
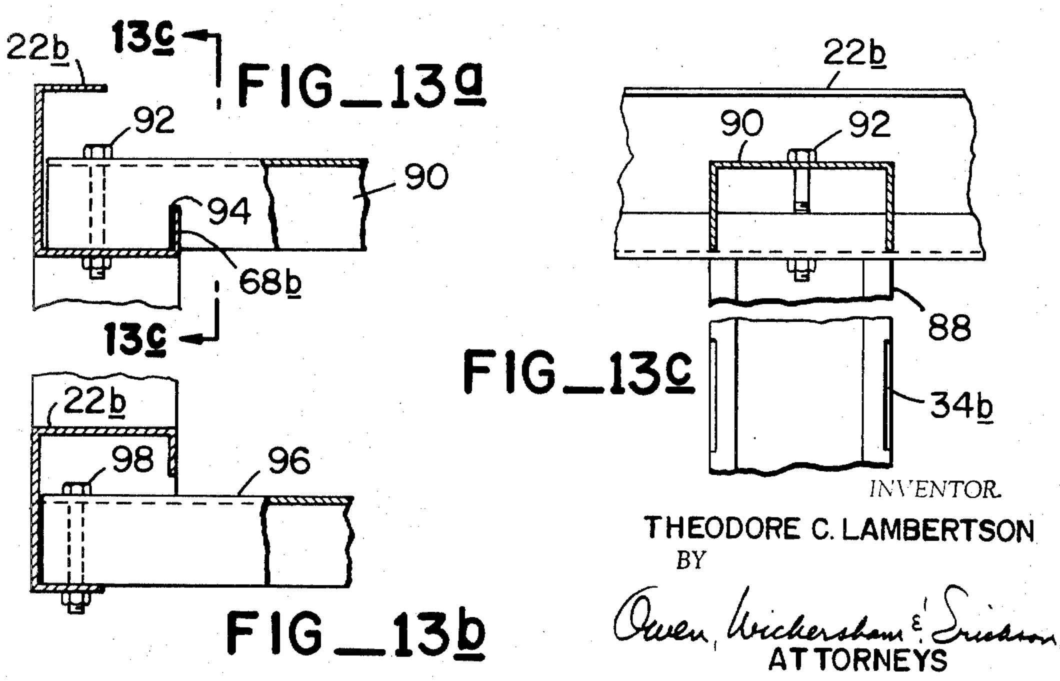
Figures 14, 14A, 14B:
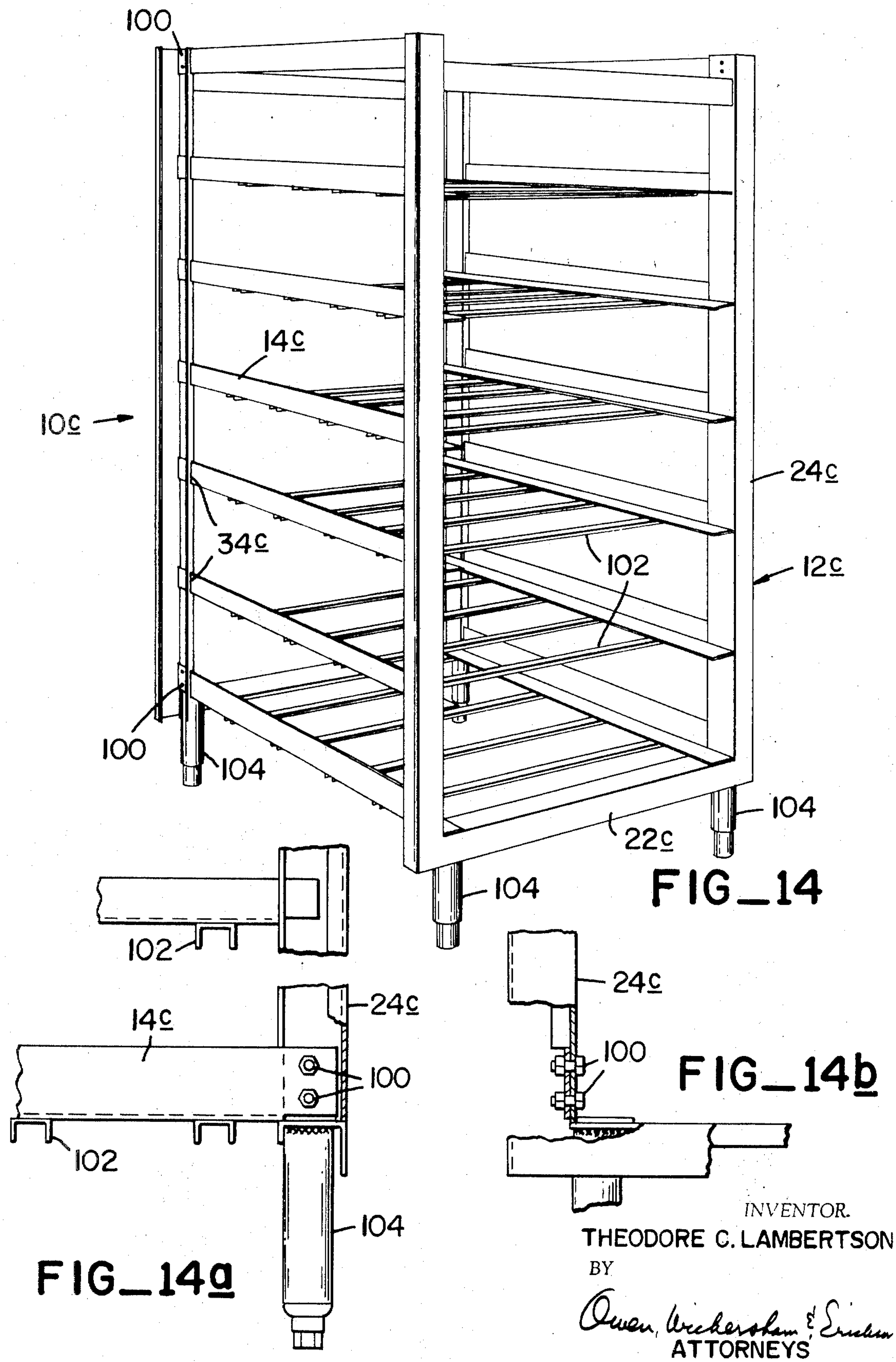
Figures 15, 15A:
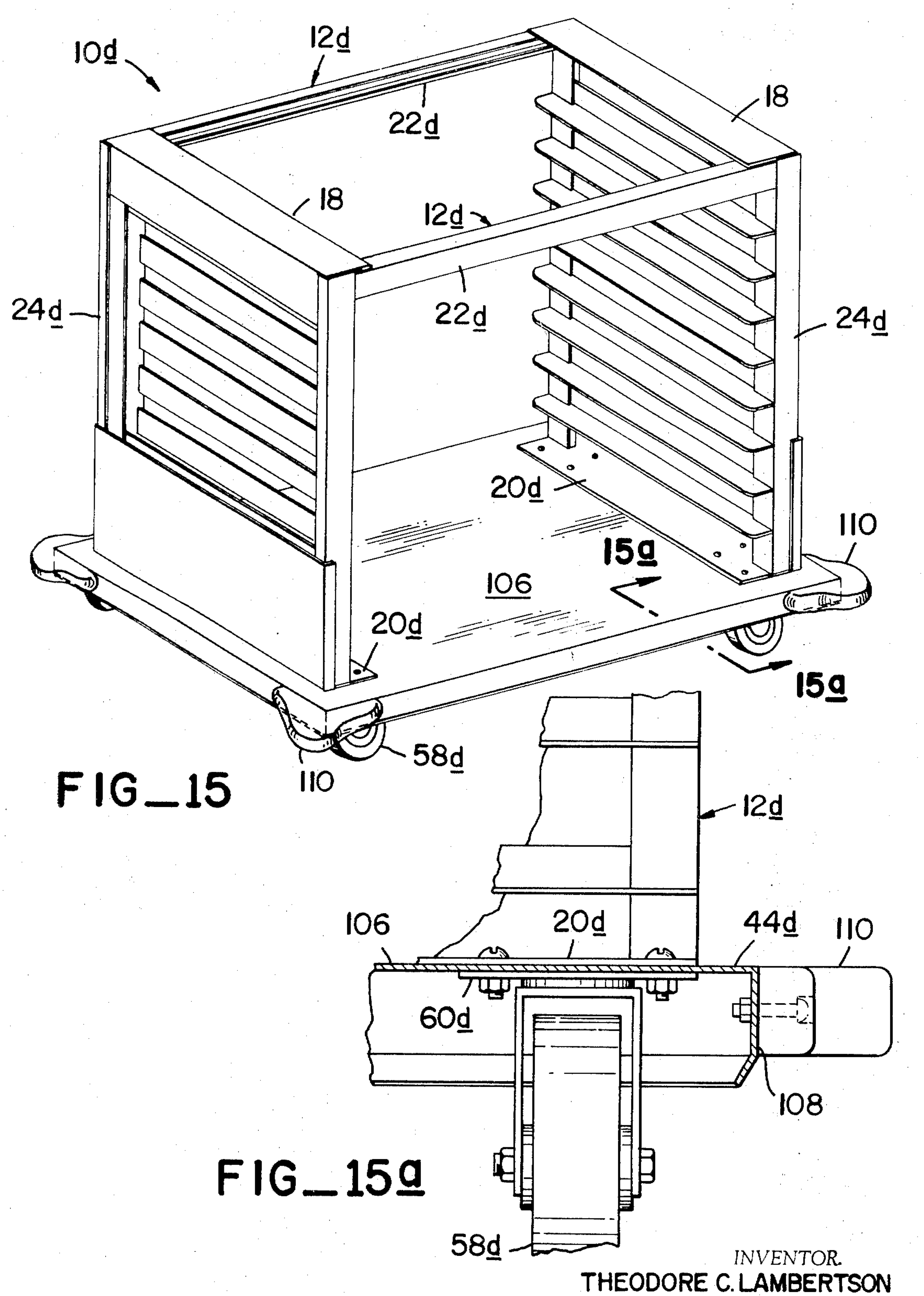

FIG. 6*a* is another view in perspective showing the lower corner portion fully connected;

FIG. 7 is an enlarged view in perspective showing one upper corner of a frame unit of my rack with a transverse frame member shown in phantom;

FIG. 8 is a view in perspective similar to FIG. 6 with the transverse member fully installed and a portion broken away to show details;

FIG. 9 is a fragmentary view in perspective of a modified form of my rack;

FIG. 10 is a view in section taken along the line 10—10 of FIG. 9;

FIG. 11 is a view in section taken along the line 11—11 of FIG. 9;

FIG. 12 is a view in perspective showing two racks coupled together in accordance with the principles of the present invention;

FIG. 12*a* is an enlarged view in section taken along line **12*a*—12*a*** of FIG. 12;

FIG. 13 is a view in perspective showing another form of rack according to my invention;

FIG. 13*a* is an enlarged view in section taken along line **13*a*—13*a*** of FIG. 12;

FIG. 13*b* is another enlarged view in section taken along line **13*b*—13*b*** of FIG. 12;

FIG. 13*c* is a view in section taken along the line **13*c*—13*c*** of FIG. 13*a*;

FIG. 14 is a view in perspective of a heavy duty form of rack embodying the principles of the present invention;

FIG. 14*a* is an enlarged fragmentary side view in elevation and partly in section showing one lower corner of the rack of FIG. 14;

FIG. 14*b* is a fragmentary front view in elevation of the same corner portion shown in FIG. 14*a*;

FIG. 15 is a view in perspective of another form of rack embodying the features of my invention; and FIG. 15*a* is an enlarged fragmentary view in elevation and in section taken along line **15*a*—15*a*** of FIG. 15.

Figures 1, 2, 3, 4:
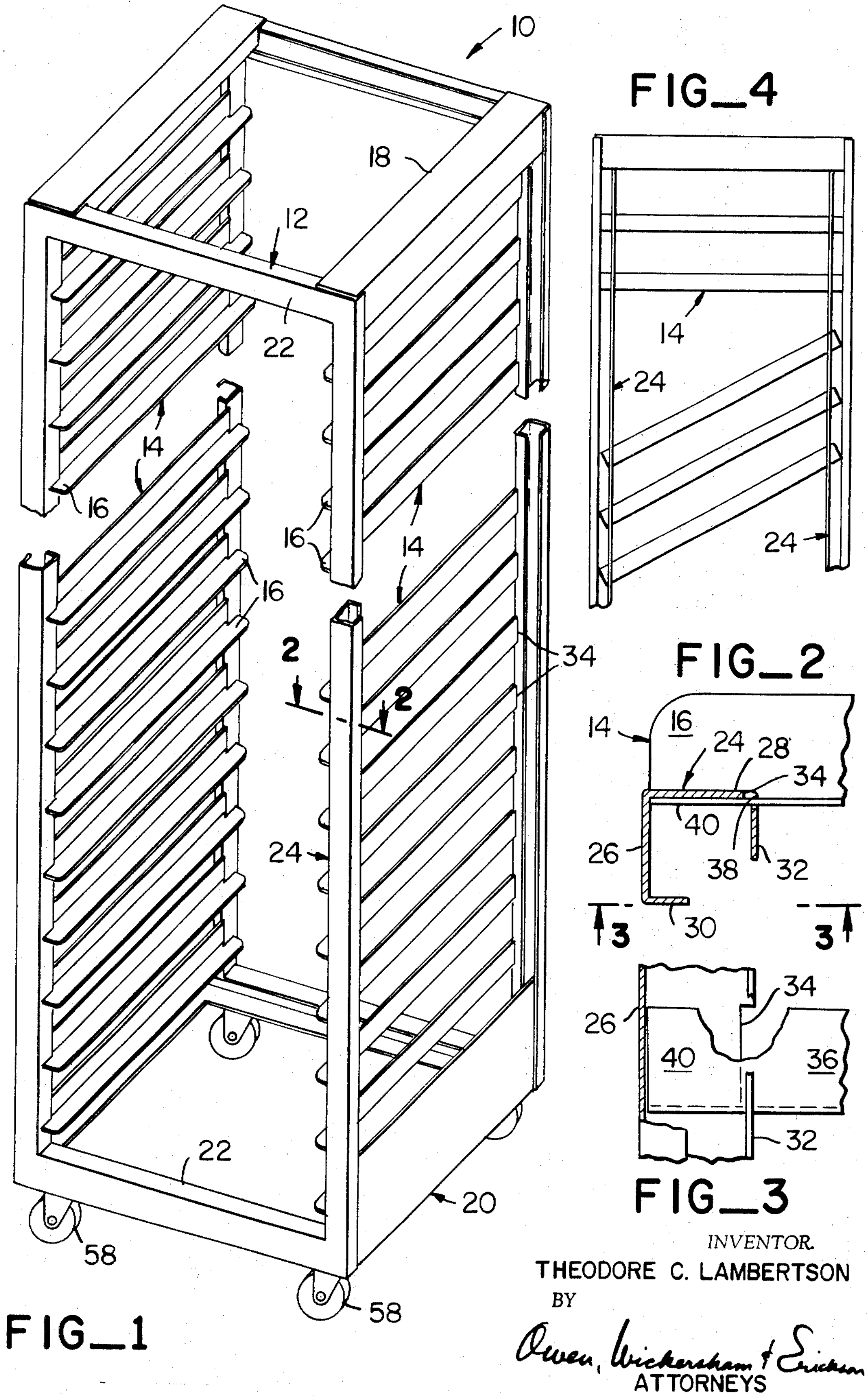
FIG. 1 is a view in perspective with portions broken away of a movable rack embodying the principles of the present invention.
FIG. 2 is an enlarged fragmentary view in section taken along the line 2—2 of FIG. 1.
FIG. 3 is a view in section taken along the line 3—3 of FIG. 2.
FIG. 4 is a fragmentary view in side elevation illustrating how tray-supporting side members can be installed horizontally or on a slope.

Referring to the drawing, FIG. 1 shows a rack 10 embodying the principles of the present invention as it appears when fully assembled and ready for use in storing or transporting a large plurality of rigid articles such as trays and the like. Generally, it comprises a pair of rectangular-shaped, upright frame sections 12 that between them support a plurality of side members 14 each having an inwardly extending flange portion 16. The latter members are removably connected to the upright frame sections 12 and can thus be easily installed at different vertically spaced apart intervals and in various horizontal or sloped positions, as may be desired. At their upper ends, these upright frame sections are connected together by a pair of transverse locking frame members 18, and similarly at the lower ends by another pair of transverse frame members 20. Because of their unique structural configuration, the upper transverse frame members and the tray-supporting side members 14 are easily connected to the upright frame sections 12 without the necessity for using any fasteners such as nuts, bolts, screws and the like. The lower tranverse frame members require only a relatively few fasteners. Consequently, the rack 10 can be erected quickly by unskilled personnel, without special tools, and it also can be easily altered if necessary, to increase or decrease the spacing between the tray-holding side members.

In the embodiment of FIGS. 1–11, the upright frame sections 12 are comprised of upper and lower horizontal end portions 22 and vertical portions 24 which are preferably fixed together at their ends, as by welding. These vertical frame portions, and in fact all of the other members of my rack 10 are preferably made from a strong, durable, but relatively light and corrosion-resistant metal such as stainless steel or aluminum. Moreover, the overall configuration of all the rack components or members including the connecting transverse end members is such that they can be made from sheet material of a uniform thickness which is bent to have the desired cross-sectional shape. The vertical portions 24 of each frame section have a flat-sided cross section with two full-sided flange portions 26 and 28 connected at a right angle corner and a pair of narrow flange portions 30 and 32 bent at right angles to the edges of the flange portions 26 and 28, respectively. In the narrow flange 32 along the edge of the full-sided flange portion 28 and spaced at even intervals on each vertical frame portion are provided a series of rectangular slots 34. The slots 34 on the vertical frame portions of the two frame sections are thus aligned so that they can receive the ends of the rack-supporting side members 14.

As shown in FIGS. 2 and 3, these side members are essentially angle-shaped, each having the horizontal flange 16 with a vertical flange 36 connected thereto. At their ends, these vertical and horizontal flanges are separated by a slot 38 that in effect forms a tab-like end portion 40 on the vertical flange. When the rack 10 is fully assembled, as shown in FIG. 1, the latter tab-like end portions fit into the aligned slots 34 of the vertical frame portions and lie flush against the inside surface of their side flange portion 28. The side members 14 perform no function of holding the frame members together, so they may be installed in any number in the rack or whatever spacing is desired. If necessary to display articles in a sloped position, the ends 40 of the side members 14 may be inserted in slots 34 which are on different levels, as shown in FIG. 4.

An important advantage of my rack is that it can be shipped or stored in knockdown form and then quickly assembled when needed without the use of fasteners of any kind. To accomplish this feature, the two identical rectangular frame sections 12 are interconnected by unique end portions of both the transverse frame members 18 and 20. The interconnection of the lower transverse frame members 20 to the upright frame sections 12 is shown in FIGS. 5 and 6. As seen, the lower transverse frame member 20 is essentially L-shaped in cross section having a main vertical flange 42 connected to the outside edge of a horizontal flange 44 with a short upright flange 46 along the latter's inner edge. Along its top edge, the vertical flange 42 is curved over and folded back to form a narrow top flange 48 which is spaced inwardly from the inner surface of and parallel to the vertical flange. Near the end of this latter top flange its connecting portion with the vertical flange is removed so that a slot 50 between the latter and the end portion 52 of the top flange is exposed from above. A narrow end flange 54 at the end edge of the vertical flange extends at a right angle thereto and also to the plane of the top flange but is spaced from it an amount slightly greater than the thickness of the metal of the vertical frame portion 24. At the lower corner of the frame section 12, the outer narrow flange 30 of each vertical frame portion 24 is spaced from the end edge of a lower flange 56 of a bottom horizontal portion 22 of the frame section 12. Thus, as shown in FIG. 6, the lower portion of each vertical portion 24 which includes the outer narrow flange 30 and part of the adjoining full flange 26 is L-shaped in cross section and fits within the L-shaped slot 50 formed by the top flange portion 52 and the vertical flange 42 of the lower transverse member 20.

Supporting rollers or casters 58 are mounted on the rack 10 near the four corners of its lower end so that it can be easily moved from one location to another. The caster can be of any suitable type and preferably is mounted on a plate 60 which is fixed to the horizontal flange 44 of the lower transverse member 20 by four bolts 62 secured by nuts 63, as shown in FIG. 5. Two of the bolts 62 for each caster, which are preferably the carriage type, extend through openings in the lower flange 56 of the frame section 12 as well as through aligned openings in the flange 44 of the lower transverse member and the caster plate 60. Thus, these bolts serve to increase the rigidity of racks 10 that are intended to be movable. The lower end portion of the completely assembled rack is shown in FIG. 6*a*. If the rack 10 is to be used as a stationary storage device with no casters, then the bolts 62 are not necessary.

In FIGS. 7 and 8, the unique interconnection of upper transverse frame members 18 with the two frame sections 12 is illustrated in detail. At the upper corners of the frame section 12, a horizontal frame portion 22 is fixed to and has essentially the same cross section as the vertical frame portions 24. Thus, it has full vertical and horizontal flanges 64 and 66 connected at a right angle with narrower horizontal and vertical flange portions 68 and 70, respectively, connected at right angles to the edges thereof. Both upper transverse frame members 18 also have an L-shaped cross section similar to that of the vertical frame portions 24 but with larger horizontal and vertical flanges 72 and 74 and similarly larger narrow flange portions 76 and 78, respectively, along their edges. At the ends of the right angle bend between the horizontal flange 72 and its attached narrow flange portion 76 is a slot 80. Another slot 82 is provided in the narrow flange portion 78 connected to the vertical flange 74 of both transverse members 18. Both of the latter slots 80 and 82 are somewhat wider than the thickness of the narrow edge flange 70 of the upper horizontal portions 22 of the frame sections 12. Thus, when the upper transverse members 18 are installed they are originally tipped upwardly so that the slots 80 can be aligned with the narrow flanges 70 of upper horizontal members of the frame sections 12 (see FIG. 7). The transverse member 18 is then moved forward until it can pivot downwardly inside the vertical portions 24 of the frame section 12, and as this takes place the narrow flanges 32 of the vertical frame portions fit within the slots 82. Thus, when in place as described, the upper transverse members 18 essentially lock the two frame sections 12 together to form a structure that is strong and rigid.

In the embodiment of FIGS. 2 and 3 the desired number of rack-holding side members 14 are installed at the spacing preferred prior to the time that the upper transverse members are installed. Once the upper transverse locking frame members 18 are in place the side members cannot be removed but are held firmly in place. Generally, in erecting this rack 10, the frame sections 12 are first connected to the bottom transverse frame members 20 and then the rack-supporting side members 14 are inserted with their tab ends inserted in the slots 34. The upper transverse frame members 18 are the last to be installed. If it is desired to alter the spacing arrangement or number of the rack-holding side members, the upper frame members can be quickly removed and the frame units can be easily spread apart to make the necessary changes.

In a modified form of my rack, vertical portions 24*a* are provided which are formed somewhat differently from the vertical portions 24 of the earlier embodiment to receive the rack-supporting side members 14. As shown in FIGS. 9–11, these vertical portions may have generally the same cross-sectional configuration but lack the corner slots 34. Each vertical frame portion 24*a* has a series of vertically spaced apart hook-like retaining flanges 84 along its inner wall 28*a* that serves to support the ends of the side members 14. These flanges are generally rectangular in shape and attached to the inner wall of the vertical portion by an integral web portion 86 only along its bottom side. Thus, each flange 84 extends upwardly from its web parallel to the wall 28*a* and spaced outwardly from it an amount slightly greater than the thickness of the side mounting member 14. A tab end portion of the latter can thus fit easily between the flange 84 and the inner wall while being supported by the flange web. The flanges 84 are easily formed when the vertical frame portions 24*a* are made by conventional methods during the construction of my rack by merely punching them outwardly from sheet material using a suitable die. Sheet material of ample thickness can be used to afford the necessary strength and rigidity to the flanges so that the side members will be stable and well supported when installed. A particular advantage of this embodiment over the construction of FIGS. 2 and 3 is that the number and spacing of the side members 14 can be more easily changed after the frame sections 12 have been joined together.

For certain applications it may be desirable to join together two or more of the racks 10 to increase temporarily the carrying capacity for trays or other articles. As shown in FIGS. 12 and 12*a*, this is readily accomplished by a multiple rack modification 10*a* which can be installed quickly and easily by relatively unskilled labor. On each rack that is being connected to another similar rack, one lower frame member 20 is removed including the two casters 58 attached thereto. An angle member 18 which is identical to an upper frame member 18 is installed to replace each removed lower frame member and is locked in place between frame sections 12 in the same manner as at the top of the rack. As shown in cross-sectional view of top joint (FIG. 12*a*) the two racks 10 are now merely connected together by a plurality of bolts 86 which extend through the adjacent frame members 18. The joint at the bottom of the rack 10*a* is identical to that shown for the top and would appear the same as FIG. 12*a* if it were rotated 180°. It should be apparent that the coupling of additional racks 10 could be accomplished in the same manner as described above.

In another embodiment of my invention, a rack 10*b* of extended length is provided having two or more intermediate upright frame portions 88 for accommodating multiple rows of vertically spaced apart side members 14. In such an arrangement, as shown in FIG. 13, these intermediate upright frame portions are generally channel shaped and welded in place to the horizontal frame portions 22*b*. They are also provided either with slots 34 or with hook portions to form slots as previously described, on both sides, to accommodate side members 14 in the desired spacing. Above and below the intermediate frame portions 88 are supporting transverse upper and lower frame members 90. These are preferably channel shaped and are connected by bolts 92 at each end to the horizontal frame member 22*b*. A pair of slots 94 may be provided in the flanges of the frame members to fit over the flange 68*b* of the horizontal frame portions 12*b*, thereby helping to lock these members together. At the bottom of the rack 10*b* a similar series of intermediate channel members 96 are connected near their ends to the lower horizontal frame portions by suitable bolts 98, as shown in FIG. 13*b*. As shown, this rack can also be provided with casters and interconnecting frame members at its ends as previously shown and described with respect to the rack 10.

In FIG. 14 another modified rack 10*c* each of which also incorporates the features of the present invention and is useful in supporting unusually heavy loads. It includes a pair of frame sections 12*c* each of which is comprised of upright frame members 24*c* interconnected by bottom horizontal frame members 22*c*. A somewhat smaller horizontal frame member is fixed as by welding to the upper ends of the upright members. The upright members 24*c* of each frame section are provided with a series of vertically aligned slots 34*c* to support removable side members 14*c*. The latter, as with the side members previously described, have a right angular cross section with a horizontal flange portion integral with a vertical flange portion, the ends of the latter fitting within the slots 34*c*. The ends of the uppermost side members are fixed by suitable fasteners 100 such as machine bolts to the inner flange of the upright frame member 24*c*. Similarly, enlarged side members at the lower end of the rack are connected by a plurality of bolts 100 to the same vertical flange of the upright frame members (see FIGS. 14*a* and 14*b*). In this embodiment, the side members 14*c* are all connected together by a plurality of spaced-apart channel-shaped reinforcing stringers 102 which provide extra strength and rigidity to the rack. The rack 10*c* is shown supported on four fixed legs 104 which are attached as by welding to the lower horizontal frame member 22*c*. However, casters in lieu of the legs could be employed within the scope of the invention. Like the previous embodiments, the rack 10*c* can be easily erected and disassembled or altered in the number of spacing of the side members 14*c*.

In yet another embodiment of my invention shown in FIG. 15, a rack 10*d* is provided with a planar base member 106 in a slightly different construction. The upper part of this rack is the same as the rack 10 with frame sections 12*d* being connected by locking transverse members 18. These frame sections 12*d*, however, do not have a lower horizontal member; and each is therefore comprised of upright members 24*d* fixed to an upper horizontal member 22*d*. At their lower ends the frame sections 12*d* are connected by a pair of lower locking frame members 20*d* which connect with the upright frame portions 24*d* as on the rack 10. The horizontal flanges 44*d* of both the frame members 20*d* rest directly on and are attached to the base member 106. Four casters 58*d* each pivotally mounted on a plate 60*d* are located at the corners of the rack 10*d*, plate 60*d* of each bearing flush against the underside of the base member 106. At each corner four bolts extend through the flange 44*d* of the frame member 20*d*, the base member 106 and the caster mounting plate 60*d* to hold the assembly together. The base member is preferably made of sheet metal and is provided with a turned down edge flange 108 which gives it a thicker and more pleasing appearance. Attached to each corner of the base plate is a bumper 110 perferably formed from some shock-absorbing material such as rubber. The latter are secured to the base plate flange by suitable fasteners. In essence, the base plate takes the place of lower cross member portions on the frame sections and provides a bottom area capable of supporting relatively heavy objects. Yet it also has removable side members 14*d* as in the previous embodiments which can be placed at the desired location and spacing to support trays and the like.

From the foregoing, it should be apparent that my invention provides a unique and highly versatile rack structure. The speed and simplicity with which the rack can be erected, and the strength and stability of the assembly due to its connecting joints which require no fasteners are important features.

To those skilled in the art to which this invention relates, many changes in construction and widely differing embodiments and applications of the invention will suggest themselves without departing from the spirit and scope of the invention. This disclosures and the description herein are purely illustrative and are not intended to be in any sense limiting.

I claim:

1. A rack for supporting a multiplicity of articles in spaced apart arrangement comprising a plurality of components connectable togther and capable of being assembled and disasembled rapidly, said components including in combination:

a pair of frame sections each including parallel, spaced apart, vertical portions with upper and lower horizontal portions connected thereto, all said frame portions having an angular cross section with a plurality of elongated side walls integrally connected at angles to each other and including end flanges terminating along spaced apart longitudinal edges;

retaining means on each said vertical portion;

a plurality of article-supporting members having end portions removably supported by said retaining means and extending between said frame sections;

a pair of lower connecting frame members connectable to said frame sections at their lower ends; and a pair of upper connecting frame members having end locking means formed by slots therein spaced from their opposite ends and cooperating with said end flanges of said frame sections that fit within said slots to interconnect said frame sections.

2. The rack as described in claim 1 wherein said elongated side walls on said vertical portions join together to form an inside corner edge, and said retaining means comprises a series of elongated, vertically aligned and spaced apart slots along the said corner edges of opposite vertical frame portions.

3. The rack as described in claim 1 wherein each said frame section is comprised of a pair of said vertical portions welded to said horizontal portions fixed near the ends thereof.

4. The rack as described in claim 3 wherein said end locking means of each said upper connecting frame members includes a flange portion having slots at opposite ends which are transverse to its longitudinal axis for receiving and retaining said end flanges of said vertical portions thereby securing said frame sections together.

5. The rack as described in claim 3 wherein each said upper connecting frame member includes means for slidably engaging a flange portion of a horizontal portion of the frame sections so that it can rotate into its locking position relative to said vertical portions of said frame sections.

6. The rack as described in claim 5 wherein said means for slidably engaging a horizontal frame portion comprises longitudinal slots extending inwardly from opposite ends of said upper connecting frame member.

7. The rack as described in claim 1 wherein said lower connecting frame member has an angular cross section formed by vertical and horizontal flange portions; tab means spaced from and parallel to the inside surface of said vertical flange; and right angle flange means connected to its end edges, said tab means and flange means combining to form L-shaped slot means for slidably receiving the end of one said vertical frame portion.

8. The rack as described in claim 1 including a mounting means for casters or legs fixed to said horizontal flange portion of both said lower connecting frame members and fastener means extending through said mounting means and a horizontal portion at the lower end of each said frame section.

9. A rack for supporting a plurality of tray-like articles, comprising:

a series of spaced apart, parallel main frame members, each having a plurality of spaced apart openings forming retaining means aligned along their vertical axis;

a plurality of side members each with tab portions at both ends supported by said openings, said side members being spaced apart on pairs of said frame members; and upper and lower frame connecting members each having transverse and longitudinal slots cooperating with said upright main frame members for holding and locking said upright frame members and said side members together.

10. A rack for supporting a multiplicity of articles in spaced apart arrangement comprising a plurality of connectable components capable of being assembled and disassembled rapidly, said components including in combination:

a pair of rectangular frame sections each including a pair of parallel, spaced apart, vertical portions of sheet metal bent longitudinally to form a generally angular cross section having elongated side walls including edge flanges that are spaced apart and form a longitudinal opening, and interconnecting transverse frame portions connected to the ends of said vertical portions;

retaining means on each said vertical portion forming vertically aligned and spaced apart openings;

a plurality of article-supporting side members having end portions removably supported in said retaining means and extending between said frame sections, each said side member having a horizontal flange for supporting the edge of an article;

lower connecting frame members joining said frame sections together at their lower ends; and upper connecting frame members having end locking means formed by slots therein at their opposite ends and cooperating with said edge flanges of said frame sections for connecting said frame sections together at their upper ends.

11. The rack as described in claim 10 including on each frame section at least one additional vertical portion spaced between and parallel to said pair of vertical portions and permanently fixed to said transverse frame portion at its ends.

12. The rack as described in claim 10 in combination with another rack having identical components, and bolt means extending horizontally through adjacent portions of said upper and lower connecting frame members for securing the two racks together so that they are movable as a single unit.

13. The rack as described in claim 10 including a plurality of casters attached to its lower end, each caster including a mounting plate and bolt means extending through said mounting plates, said frame section and said lower connecting frame members.

14. The rack as described in claim 10 wherein said frame sections are elongated horizontally, each including at least one additional upright frame portion spaced between and parallel to said vertical portions and having retaining means on opposite sides providing vertically aligned and spaced apart openings for supporting said side members.

15. A rack for supporting a multiplicity of articles in spaced apart arrangement comprising:

a pair of frame sections, each including a pair of parallel, spaced apart, vertical portions having longitudinally extending integral edge flange portions and interconnected by upper and lower horizontal frame portions;

retaining means on each said vertical portions forming vertically aligned and spaced apart openings;

a plurality of article-supporting side members having end portions removably supported in said retaining means and extending between said frame sections;

a pair of upper connecting frame members having end locking slots engaging said edge flange portions for holding said frame sections together at their upper ends;

a pair of lower connecting frame members joining said frame sections together at their lower ends, each having a horizontal flange portion extending longitudinally and transverse means at its opposite ends cooperating with said edge flanges of said vertical frame portions;

a planar base member extending between and adjacent to said horizontal flanges; and fastener means connecting said base member to said horizontal flanges.

16. The rack as described in claim 15 including a caster assembly having a mounting plate at each corner of said rack, said fastener means comprising bolts extending through said horizontal flanges, said base and said mounting plates.

17. The rack as described in claim 15 wherein said base member is of sheet metal and has a downwardly turned flange along its sides, and resilient bumper means fixed to said flange at each corner of said rack.

References Cited

UNITED STATES PATENTS

| | | | |
|---|---|---|---|
| 2,808,944 | 10/1957 | Jones | 211—148 |
| 2,936,899 | 5/1960 | Tashman | 211—134 X |
| 2,959,298 | 11/1960 | Pope | 211—126 |
| 2,989,193 | 6/1961 | Smith | 211—126 X |
| 3,102,641 | 9/1963 | Konstant | 211—148 |
| 3,112,034 | 11/1963 | Kaufman | 211—148 |
| 3,152,698 | 10/1964 | Maddox | 211—126 |
| 3,199,683 | 8/1965 | Graswich | 211—126 X |
| 3,222,117 | 12/1965 | Schwartz | 211—126 X |
| 3,244,290 | 4/1966 | Kaufman | 211—148 |

NILE C. BYERS, Jr., Primary Examiner